United States Patent [19]
Blumé

[11] Patent Number: 6,097,902
[45] Date of Patent: Aug. 1, 2000

[54] ENHANCED DEVICE FOR PRODUCING ANALOG AND DIGITAL IMAGES FROM DENTAL RADIOGRAPHIC FILM AND PROCESS FOR USING THE SAME

[76] Inventor: Stephen Thomas Blumé, 25462 Wagon Wheel C., Laguna Hills, Calif. 92653

[21] Appl. No.: 09/140,113

[22] Filed: Aug. 25, 1998

Related U.S. Application Data

[63] Continuation-in-part of application No. 08/683,510, Mar. 29, 1996, Pat. No. 5,870,172.
[51] Int. Cl.[7] ............................ G03D 13/00; G03D 13/04
[52] U.S. Cl. ............................................ 396/569; 396/639
[58] Field of Search ..................................... 396/569, 639; 355/27–29; 378/62, 68, 98.3, 98.5; 358/487; 348/81

[56] References Cited

U.S. PATENT DOCUMENTS

| | | |
|---|---|---|
| 4,965,601 | 10/1990 | Canty ........................................ 348/81 |
| 5,101,286 | 3/1992 | Patton ...................................... 358/487 |
| 5,235,372 | 8/1993 | Blume ...................................... 396/625 |
| 5,432,579 | 7/1995 | Tokuda ...................................... 355/27 |

*Primary Examiner*—D. Rutledge
*Attorney, Agent, or Firm*—Patent Law Firm, P.C.; Manfred E. Wolff

[57] ABSTRACT

A device to produce a video (analog) image, a digital image, a hard copy picture, and a high quality developed radiographic film from an exposed dental radiographic film is disclosed, comprising a film processing tank having an image enhancing video camera mechanically attached in a configuration to capture in a well-focused manner the positive image, similar in appearance to a normal black and white photographic print, forming on the film being processed. The positive image is captured for viewing on a video monitor or for digitization. The digitized image can then be stored, hard copy printed, or viewed on the computer monitor with, zooming, altering, and further enhancing capabilities. Methods for use of the device in dental diagnosis, and kits containing the device and instructional materials are also taught.

16 Claims, 5 Drawing Sheets

ENHANCED DEVICE FOR PRODUCING ANALOG AND DIGITAL IMAGES FROM DENTAL RADIOGRAPHIC FILM AND PROCESS FOR USING THE SAME

RELATED APPLICATIONS

This application is a continuation-in-part of U.S. Ser. No. 08/683,510 filed Mar. 29, 1996, for APPARATUS FOR PRODUCING A VIDEO AND DIGITAL IMAGE DIRECTLY FROM DENTAL RADIOGRAPHIC FILM, which is allowed for issue as U.S. Pat. No. 5,870,172

BACKGROUND ART

This invention relates to dental imaging devices and their use in dental radiology and dental practice. More specifically, this invention relates to producing analog and digital images from positive images on x-ray film using a device comprising a tank having a window with at least one camera movably attached and at least one monitor, whereby capture from x-ray film of positive video images that can readily be displayed on video monitors is broadly enabled, and wherein the functional utility, ease of use, and wide applicability of the device in dental practice constitutes progress in science and the useful arts. Furthermore, the present invention teaches processes for the use of the device in dental diagnosis and practice.

Dentistry is the treatment and care of the teeth and associated oral structures. In addition to general practice, currently there are eight recognized specialties within the field of dentistry. These specialties include periodontics, endodontics, orthodontics, prosthodontics, pedodontics, oral pathology/oral medicine, oral and maxillofacial surgery, and dental public health. Each of these specialties has a designated function for the care of the patient. A periodontist is responsible for treating periodontal (gum) disease. This treatment may range from regular maintenance visits with a hygienist to surgical procedures designed to save teeth. An endodontist's responsibilities include aiding in diagnosis of tooth pain and performing root canals and surgical procedures to treat the nerve tissue to save teeth. An orthodontist diagnoses and treats occlusal discrepancies and malaligned teeth with braces and orthodontic appliances. A prosthodontist specializes in preparing crowns, bridges, dentures, and implants. Prosthodontists can be especially helpful for complicated cases. Pedodontists only treat children and young adults (usually until about 18 years old). An oral pathologist is trained in diagnosis and treatment of pathological conditions affecting the tissues of the oral cavity. Most people associate oral surgeons with the extraction of wisdom teeth. In some cases, this may be the oral surgeon's "bread and butter," but oral surgeons are trained in many other areas of oral and facial surgery. In fact, several oral surgery programs offer combined dental and medical degrees (DDS or DMD and MD).

Dentistry is mainly concerned with tooth decay, disease of the supporting structures such as the gums, and faulty positioning of the teeth. Like medicine, dentistry has ancient roots, and the Etruscans already made excellent crowns and bridges in the seventh century BC. However, one of the greatest advances in dental practice, the use of diagnostic x-rays, was not discovered until 1895. In many situations in a dental office it is very desirable for the dentist to view a radiographic image of one or more teeth quickly on a video or computer monitor, both for time savings, and to show the patient an image of his/her tooth.

Normally, patients seek the care of their general practitioner dentist for a dental problem. Regardless of the particular symptoms which lead a patient to seek treatment by a dentist, the first step that the dental practitioner takes is to begin a diagnosis of the pathology underlying the symptoms, so that a course of treatment can be determined. Among the most powerful techniques that the dentist has available to make such a diagnosis is the process of radiological imaging (x-ray imaging).

Film based radiographic imaging (x-ray films) is the most common imaging modality in current dental practice. Such an image is of value in several ways other than diagnosis and treatment planning. Thus, such images are important for informing other dental specialists to whom the patient may be referred by the primary practitioner, for clinical management documentation to record the progress of the treatment, for office management documentation, such as documenting insurance billing, and for discussions to apprise the patient of his or her condition and treatment. Each of these applications requires close examination of the x-ray image, and some applications require that the image be transported from one site to another. Thus, it is clear that methods to facilitate the viewing and transport of dental x-ray images are of major importance in dental diagnosis and practice.

Over the last 100 years, radiographic film (x-ray film) has gone through several evolutionary changes to improve its resolution and dynamic range, reduce fogging, and increase speed (hence requiring less x-ray radiation). Through years of clinical usage, film based radiography has become the acceptable technique and a gold standard for clinical acceptance of alternative radiographic imaging systems. Today, more than 95% of dentists using radiography employ x-ray films.

The American Dental Association (ADA) has specific recommendations for radiographs (x-rays), although dentists are also encouraged to use their professional judgment based on the health and dental history of the patient. For an adult patient who has several restorations and might be cavity-prone, yearly radiographs are recommended. The type of radiograph that aids in diagnosis of decay or bone loss between teeth is called a bitewing x-ray. Many dentists consider a reasonable amount of dental radiography to include a full mouth set of radiographs every 5–7 years; bitewing radiographs every 1–2 years, and any additional films necessary to aid in the diagnosis of a particular condition. One reason to take bitewing radiographs is to check between the teeth because this area cannot be seen during a dental examination. Bitewing x-rays help reveal problems while they are small, before they cause any symptoms.

The dentist also checks the bone level adjacent to the teeth, examines the roots and nerves of teeth, checks the position and development of teeth, diagnoses lesions such as cysts or tumors, assesses damage when trauma occurs, and diagnoses and monitors periodontal disease. Even if a patient has a healthy mouth, these radiographs can prove to be very beneficial for future comparison— especially if a dental emergency or condition should arise. Thus, dental radiographs are invaluable aids in diagnosing, treating, and maintaining dental health in both children and adults.

The exposure time for dental radiographs is minimal. The risk of ill effects from exposure to x-rays is essentially non-existent in the case of dental x-rays. A comparison of radiation doses from radiography and background radiation (atmospheric, cosmic, etc. radiation) can be made with the mean active bone marrow dose. Researchers compared whole-body bone marrow dose from background radiation to the data from radiographic examinations. They concluded that if a person in an average location in the United States were to receive a full-mouth intraoral periapical and panoramic examination every four months for the rest of his life, he or she would incur only the same risk as a person living in Denver who was not exposed to dental radiography. Denver is exposed to more atmospheric radiation, due to the high elevation of this city.

After x-rays are obtained in the office of the primary care dentist or the dental specialist, the dentist must examine them in order to diagnose the dental ailment to be treated, as already mentioned. Thus, the dentist may identify dental decay, or caries, by noting dark areas on the x-ray. As previously noted, the dentist also checks the bone level adjacent to the teeth, examines the roots and nerves of teeth, checks the position and development of teeth, diagnoses lesions such as cysts or tumors, assesses damage when trauma occurs, and diagnoses and monitors periodontal disease. In order to do this, the dentist must carefully examine the x-ray image. The conventional way in which this is done is to clip the film to a source of even, diffused light, often called a "lightbox".

Alternatively, the film is simply held up to a source of light, such as a lamp. The abnormal areas in the teeth can then be viewed and noted. The patient also can view these areas as pointed out by the dentist. However, inasmuch as only a life-size view of the teeth is seen in this manner, it is often difficult to discern the areas of pathology using this technique. Accordingly, a need has existed for viewing x-ray images in enlarged format, but simple means to do this have not been forthcoming.

Moreover, in the past, dentists have had to rely on developing dental x-ray film in their offices in order to have rapid access to the images while treating the patient. Automatic and manual dental x-ray film processors heretofore known require about six minutes to produce a single dental x-ray film image ready for mounting. This delay undesirably requires the patient to sit alone in the treatment room for some period of time, undesirably prolongs the time the patient must spend in the dental office, and undesirably reduces the number of patients per day that the dentist can treat.

Variations on the known film processing systems have not been forthcoming, despite recent developments in the technology related to film processing. Even though x-ray films are used extensively in dental practice, prior art film processing devices, dental film based products, or methods available to dentists have not adequately addressed the required need for accelerated rapid imaging of dental x-ray film as set forth below.

By way of background, attention is called to the following. Prior patents have described apparatus for the capture of an image from negative photographic film while it is being processed in an automatic roller processor. In U.S. Pat. No. 5,101,286 Patton captures the film image in the bleach tank or just after the bleach tank of an automatic roller processor. It is then digitized for viewing and evaluation. This apparatus is used to determine if a photographic print from the negative in question should be made. In U.S. Pat. No. 5,432,579 Tokuda describes the image capture from a film negative in an automatic roller film processor wash tank. The image is then sent to a printer/processor where photoprints are made.

The above two patents differ from the present invention in that they both are involved with the capture of an image from film negatives. They are both entirely involved with photographic film. In U.S. Pat. No. 4,965,601 Canty describes a camera attached to a window in a reaction vessel. This vessel is used for chemical, food processing, metallurgical processes, and the like. None of these inventions are suitable for dentistry, nor are they commercially available or marketed to dentists.

By way of further background, attention is called to prior art methods and devices that have attempted to avoid the dental film processing delay by eliminating dental film altogether. One development to address this need that has appeared in recent years is that of digital dental imaging (digital radiography) using intraoral radiographic sensors based on charge-coupled devices (CCD). These are small x-ray sensors, comparable in size to an intraoral film. They are used in place of film and are linked directly to a computer. When an x-ray image is taken using these sensors, the image is not recorded on film, but instead is digitally recorded in the computer and displayed on a display device.

Current technology for creating a digital radiological image of a patients'teeth uses a sensor which is configured to be sensitive to x-rays. This sensor is electronically connected to a computer thence to a monitor and/or a printer. This sensor is placed in the patients'mouth behind the area to be x-rayed. An x-ray head is then aimed at the teeth in question. The x-ray is activated, radiation going through the teeth and onto the sensor. The sensor sends the image created to a computer. The computer then digitizes the image. Once it is digitized, it can then be sent to a printer for the production of a hard copy "picture". Alternatively, it can be sent to a video monitor. Because the image is digitized, it can be further enhanced for greater clarity. It can be zoomed in or out, inverted, contrasted with different intensities, or color switched, black to white, and white to black.

Another type of digital radiological apparatus uses a phosphorescent sensor, which is sensitive to x-rays and is electronically independent of the computer. This type of sensor is placed in the mouth of the patient, much like film. It is then radiated, and placed into a "reading" apparatus, which digitizes the image on the sensor. It can then be sent to a computer for viewing, storage, and alteration as desired by the operator.

A serious disadvantage of digital radiography is its high cost. While few dentists expect miraculous revenue growth from implementing a new method of taking x-rays, most expect at least an adequate return of investment (ROI). Persistent concerns about ROI of digital radiography has led to a major slow down in the spread of the technology in the United States, and even today 97% of dentists do not use this technology. Clearly, there is a need for a device that can produce high quality video images, high quality hard copy images, and high quality radiographic film images. A technically simpler device than that used by current digital radiology would make the cost of purchase of such a device more accessible to dental practitioners. The present invention fulfills these needs.

A number of advantages have been attributed to the use of digital dental imaging, but it is pertinent to point out that in every case these advantages have either not been realized in a practical sense, or are equally well provided by the present invention in a far more cost effective manner. These unrealized advantages are discussed in the following paragraphs.

1. Dentist, Patient, and Specialist Are All Able to View Enlarged Digital Image on Monitor. This is one of the principal advantages claimed for digital imaging. However, the present invention accomplishes exactly the same objective at far lower cost. Furthermore, at the present time only about 3% of dental professionals have the expensive equipment required to receive and display digital images, so there is little chance of exploiting this supposed advantage. Again, dental professionals can employ the present invention to accomplish this objective at far lower cost.

2. Ease of Sending Images Electronically. Electronic transmission to insurance companies or other professionals is a distinct advantage, but is possible only if they have the capability to receive the images. At the present time only about 3% of dental professionals have such equipment so there is little chance of exploiting this supposed advantage.

3. Reduced Exposure Time. Although the exposure time is about 50% less with digital imaging compared to traditional radiographs, x-ray exposure is not a significant risk in normal dental x-ray practice, as already discussed. Yet, unlike film, where a new film is used for every x-ray exposure, with digital imaging the x-ray sensor is used repeatedly. After a number of exposures, the sensitivity of the sensor is so degraded that it may require a longer exposure than film. In addition, digital radiographs cover a smaller area than film radiographs; so more images may be required, in some cases resulting in an increased exposure time.

4. Processing of Film is Eliminated. The elimination of film processing has been cited as an advantage of digital radiography.

5. Image Alteration Although digital imaging does not increase diagnostic information, in principle it can be altered to make valuable diagnostic information more evident. However, this potential advantage of digital imaging is very difficult to demonstrate. For example, although alteration of the image may make visualization of cavities better; the main problem is that it is not usually clear which operations are applicable for such a diagnostic task, and these contrast enhancement operations differ among the various manufacturers. The result is that dentists rarely use this capability.

6. Disk Storage of Images. This supposed advantage of digital imaging, which avoids the need to store films, creates a disk capacity problem in a busy dental office. This requires the constant upgrading of the disk storage facility, a far more expensive task than providing film storage space.

In addition, sensor based digital radiography imaging systems have disadvantages not present in film based systems. These problems are the following:

1. The cable connection to the sensors is relatively fragile and may be broken during usage.
2. Images derived from electronic sensors or fluorescent cards have resolutions of only about 360,000 pixels, whereas film has an unrivaled resolution of 18,000,000 pixels. On a display monitor, electronic sensors or fluorescent cards have a resolution of 7–10 lines/millimeter whereas film produces a resolution of 15 lines/millimeter.
3. Electronic and fluorescent sensor cards are typically thicker than film and difficult to bend as can be done with a piece of film. This may cause great discomfort to the patient. They do not fit easily in the mouth of the patient, and the placement and removal process may scratch the delicate tissue lining the mouth and gums.
4. The price of sensors is approximately $ 3000–6000 per unit, versus the price of a film and holder of approximately $ 0.20.
5. Electronic and fluorescent sensor cards cannot be sterilized and must be reused with only a plastic bag or "baggie" to protect the patient.
6. The quality of the image produced by the reused sensors progressively deteriorates as the sensor ages, whereas a fresh film is used for each exposure.
7. Because digital images can easily be modified, they are not acceptable evidence in malpractice legal proceedings. Film negatives are the standard of evidence acceptable in a court of law.
8. The hard copy produced is also of poor quality. It is difficult for the practitioner to see much detail. Film radiographs are far superior in quality and resolution.
9. Digital radiological imaging is advantageous for only one or two films. It is not possible to take a full set of radiographs, eighteen to twenty-two films, (or even four bitewing films) and view them clearly at the same time on a computer monitor. Each individual radiograph is too small when all are viewed as a whole, considering the comparatively poor quality of digital imaging. It is necessary to be constantly zooming in and out to different individual pictures. When a dentist has a full set of "film" radiographs in front of him, his or her eyes constantly scan from film to film to contrast and compare different areas, which greatly aids in making the diagnosis. This cannot be done when a full set of radiographs is on a computer screen.
10. Ergonomically, the hard copies produced on the printer are extremely difficult to view and diagnose, when in groups of eighteen to twenty- two, and to store. Viewing the pictures is like viewing a stack of photographs. The bigger the stack, the more awkward the handling. Storing the hard copies in the patient charts, which must be done in case the computers hard disc breaks down or is destroyed, becomes cumbersome over time, because the stack of hard copies gets thicker and more cluttered.

Thus, although radiography is used commonly and extensively in dentistry, prior art visualization systems have not adequately addressed the need for enhanced visualization methods as set forth below. Advances in economically accessible enhanced radiograph viewing systems have not been forthcoming. While it has been known to enlarge digital images of radiographs with a cathode ray tube (CRT) monitor device, such disclosures have not adequately addressed the ROI constraints that must be met in order to secure widespread adoption of such systems.

In contradistinction to all of these imaging devices, the present invention embraces and finally addresses the clear need for a dental radiograph analog imaging device. Thus, as pioneers and innovators attempt to make dental imaging devices cheaper, more universally used, and of higher quality, none has approached same in combination with simplicity and reliability of operation, until the teachings of the present invention. It is respectfully submitted that other references merely define the state of the art or show the type of systems which have been used to alternately address those issues ameliorated by the teachings of the present invention. Accordingly, further discussions of these references has been omitted at this time due to the fact that they are readily distinguishable from the instant teachings to one of skill in the art.

OBJECTS AND SUMMARY OF THE INVENTION

Accordingly, several objects of the present invention are:
(a) to provide a device for producing video and digital images directly from dental radiographic film.
(b) to provide a device for rapid access to enlarged dental images directly from dental radiographic film for purposes of dental diagnosis.
(c) To provide a device that enlarges even minor or obscure evidence of dental pathology on dental radiographic film for purposes of dental diagnosis.

(d) to provide a device which overcomes the drawbacks of the prior art by incorporating the advantages of film radiography such as low cost, sterilizability, patient comfort, constant sensitivity, and constant sensitivity with the convenience of viewability on a monitor.

(e) to provide a device which overcomes the drawbacks of the prior art by making it possible for dentists, patients, and specialists to view enlarged positive radiographic images on a monitor at 15 lines/millimeter resolution using film as a source shortly after exposure.

(f) to provide a device which overcomes the drawbacks of the prior art by making it possible for dentists to take a full set of radiographs, eighteen to twenty-two films, (or even four bitewing films) and rapidly view each film interchangeably on a computer monitor.

(g) to provide a simple device that can produce high quality video images, high quality hard copy images, and high quality radiographic film images at a cost of purchase that is more accessible to dental practitioners.

(h) a process is also taught whereby dental film radiographs are taken of a patient, processed to the positive stage and displayed using the device of the invention, and interpreted by a dentist to produce a diagnosis of the dental pathology of the patient.

These and other objects are accomplished by the parts, constructions, arrangements, combinations and subcombinations comprising the present invention, the nature of which is set forth in the following general statement, and preferred embodiments of which—illustrative of the best modes in which applicant has contemplated applying the principles—are set forth in the following description and illustrated in the accompanying drawings, and are particularly and distinctly pointed out and set forth in the appended claims forming a part hereof.

The present invention provides a device to produce a video (analog) image, a digital image, a hard copy picture, and a high quality developed radiographic film from an exposed dental radiographic film. In accordance with the preferred embodiment of the present invention, there is provided a film processing tank having an image enhancing video camera mechanically attached in a configuration to capture in a well-focused manner the image forming on the film being processed. The exposed film, obtained by known methods, is transferred to a darkroom or daylight loader where the film-covering packet is removed. Next, by manual or automated means, it is placed in a tank where developing chemicals and water sequentially bathe the film. Typically, the film is first treated chemically with a developer solution. During this treatment of the film, a positive (opaque) image of the teeth (or other radiographic subject) forms, similar in appearance to a normal black and white photographic print. The inventor denotes this stage of development the opaque stage. Next, depending on the system used, the film may be water washed. Then, a fixative solution bathes the film. At this time the film gradually loses its opaque, positive appearance, and is transformed into a photographic "negative", similar in appearance to a normal black and white photographic negative. The image seems gradually to disappear, and the film is no longer opaque, but black and transparent-translucent. At this time, the image on the film is difficult to view, unless it is held over a viewing light.

A feature of this invention takes advantage of the opaque, positive stage of the film developing process. This feature is the capture of the positive image from the film for viewing on a video monitor utilizing the opaque stage of film development, which the inventor terms "analog film imaging". In another feature of the invention, the positive radiographic image is digitized for viewing on a computer monitor, which the inventor terms "digital film imaging".

Typically, dental film processing tanks are made of stainless steel or plastic material that is totally opaque. The processing tank used in analog film imaging has a window composed of a light filter material on one or more sides which will allow for the viewing of the opaque stage of film developing without damage to the film. Current video technology has created cameras that enhance the images they capture. At least one image enhancing video cameras is movably mechanically attached and positioned on the developing apparatus or tank to capture any or all opaque images that form on the films being processed. An operator controlled motorized means may be used to move the camera. A light source is provided in order to capture the images of interest. The light source may emit red or yellow color at a wavelength that will not damage the film. Alternatively, it may be a white incandescent light filtered through a filter to remove wavelengths that might damage the exposed film prior to photographic fixing. The most generally suitable light filtering materials are those that transmit only yellow to red light having wavelengths of about 600–700 nanometers, but a wider range of about 550–800 nanometers may be satisfactory for certain films.

The film, which has previously been exposed in the patients mouth, is placed on a holder and inserted into the windowed tank. This operation is conducted in a darkroom or within a daylight loader. The tank may be already filled with developer solution, or developer solution may be flowed into it. While the image forms on the film, and the film is in its opaque stage, the video camera captures a video image. This image may be transmitted to a monitor where it can be viewed by the operator in analog form. Alternatively, the image is transmitted to a computer to be digitized. By the use of computer programming, the digitized image can be enhanced to aid the diagnostic capabilities of the practitioner or be stored on the computer hard drive for future use. The enhanced image may be transmitted to a printer for hard copy printing.

After the image has been captured from the opaque stage, the developing of the film is continued in normal fashion. The film successively bathed in photographic fixative solution, washed, and dried. The effect of the present invention is to give the operator not only a high-resolution analog/digital image, but also a high quality dental film radiograph for diagnosis and storage.

Any type of manual or automatic film processor may be utilized with this invention. A preferred automated film processor for analog and digital film imaging is described in U.S. Pat. No. 5,235,372, commonly owned and invented by the present inventor, and expressly incorporated herein by reference, since the film remains static during processing. Roller or track type processors may be used with a frame grabber or pause in the operation to allow for image capture.

According to a feature of the present invention there is provided a processing tank fabricated from a material opaque to visible light wherein chemical solutions for film development and water sequentially bathe exposed dental radiographic film. Suitable materials for construction of the tank are plastics and stainless steel resistant to the action of the chemical solutions.

According to a further feature of the present invention said tank is provided with at least one window composed of light filtering material transparent only to wavelengths of light that do not affect the dental radiographic film being processsed. The most generally suitable light filtering materials are those that transmit only yellow to red light having wavelengths of about 600–700 nanometers, but a wider range of about 550–800 nanometers may be satisfactory for certain films.

According to still a further feature of the invention said tank may be placed within a manual daylight loading film processing box provided with sleeves or gloves to allow the hands of an operator to undertake film manipulation in daylight without damage to the film.

According to yet still a further feature of the present invention there is provided at least one controllable light source means that emits sufficient light through a light dispersion pane and a light filtering window to illuminate the film for image making. Suitable light source means include incandescent bulbs of about 3–5 watts, and appropriate light emitting diodes.

According to even a further feature of the present invention there is provided at least one movably mounted image capture means such as a videotube camera suitable to capture the images on the film. Each camera may have a resolution of about 330–1000 TVL, preferably about 480–570 TVL, and most preferably about 480 TVL and is preferably equipped with a close-up lens with a focal length of about 9 mm.

According to yet even a further feature of the present invention there is provided amplification means, monitor means, computer means, and printer means to which the output of the image capture means may be sent for processing and display.

According to even still a further feature of the present invention there is provided a method for the diagnosis and treatment planning of dental pathology comprising the steps of obtaining a radiographic image of the teeth of a patient, processing the resulting film in the tank of the invention, displaying the films on a monitor of the invention, diagnosing the displayed pathology, and planning a treatment based on the diagnosis.

According to yet even still a further feature of the present invention there is provided a kit containing at least one device of the invention and an instructional means such as a videotape, whereby the method of the invention may be taught and practiced through the use of the kit.

These and other objects are accomplished by the parts, constructions, arrangements, combinations and subcombinations comprising the present invention, the nature of which is set forth in the following general statement, and preferred embodiments of which—illustrative of the best modes in which applicant has contemplated applying the principles—are set forth in the following description and illustrated in the accompanying drawings, and are particularly and distinctly pointed out and set forth in the appended claims forming a part hereof.

The present invention is directed to a device for processing at least one positive, opaque image obtained from at least one developing dental x-ray film comprising in combination a reaction tank adapted to position said at least one exposed film situated in an X-Y plane in a holder, at least one mounted video camera means adapted for forming a camera image of said at least one positive opaque image of said at least one film, said camera means including a lens means having an optical axis aligned along a Z-axis perpendicular to said X-Y plane, said lens means arranged for acquiring said at least one camera image of said at least one film, said lens means adapted to provide said camera image in a sharply focused manner, said reaction tank including at least one window to allow said at least one video camera to capture said at least one positive opaque image of said at least one film, and at least one means for processing said camera image. The reaction tank window may be composed of a light filtering material selected from the group of consisting of materials that transmit wavelengths of about 550–800 nanometers, and materials that transmit wavelengths of about 600–700 nanometers, whereby said device can be used in daylight. At least one controllable light source adapted for illuminating said at least one positive opaque image for acquisition by said camera may be provided. The tank may be situated within a daylight loader box adapted with at least one sleeve adapted for inserting at least one hand of an operator into said loader with exclusion of ambient light, further adapted with at least one window composed of a light filtering materials selected from the group of consisting of materials that transmit wavelengths of about 550–800 nanometers, and materials that transmit wavelengths of about 600–700 nanometers, said window adapted to provide a camera port for said camera means and an observation port for the operator whereby said device can be operated in daylight. Alternatively, at least one controllable light source adapted for illuminating said image for image acquisition by said camera, said light source selected from the group consisting of light sources that emit wavelengths of about 550–800 nanometers, and light sources that emit wavelengths of about 600–700 nanometers may be provided.

The camera means may be arranged to move in a second X-Y plane for acquiring said at least one positive image of said film by providing means for moving said camera means as required in the Y-direction and means for moving said camera means as required in the X-direction. The means for moving said camera means as required in the X-direction may be mounted on a carriage means, wherein said carriage means is able to move in a Y-direction, whereby said camera means can be manually positioned at any predetermined XY coordinate position by an operator. Alternatively, the films may be arranged to move in said X-Y plane for acquiring said at least one positive opaque image of said film by providing means for moving said films as required in the Y-direction and means for moving said films as required in the X-direction.

The means for processing may include at least one apparatus selected from the group consisting of analog video monitors, digital monitors, hard copy devices, computers, and data storage devices, and the lens means may be a close-up video lens. The means for moving said camera means as required in the Y-direction and the means for moving said camera means in the X-direction may be at least one mechanically linked electric motor controlled by an operator directed control device to move said camera means to a predetermined XY coordinate position.

Also provided is a method for capturing and processing at least one positive, opaque image obtained from at least one developing dental x-ray film comprising the steps of transferring a previously exposed dental x-ray film and holder into a reaction tank with a window, allowing said film to be bathed in developer solution to create a positive opaque image on said film, identifying a predetermined at least one of a plurality of said films of a to be displayed, positioning a video camera means of said device to capture at least one predetermined image on said predetermined at least one film, adjusting the illumination output of an illumination means of said device to a level allowing capture of said image, focusing a lens means of said device in a manner to allow capture of said image as a focused image, operating said camera means to record a camera image of said focused image, transmitting said camera image to a means for processing, and processing said camera image in said means for processing, which may include at least one apparatus selected from the group consisting of analog video monitors, digital monitors, hard copy devices, computers, and data storage devices. This method may form a method of dental diagnosis by further including the step of diagnosing a dental pathology based on said camera image processed in said means for processing. This method may form a further method of dental diagnosis by further comprising the steps of transmitting said camera image from the dental office of a first dental practitioner to a means for processing in a dental office of a second dental practitioner, processing said camera image in a means for processing in said dental office of said second dental practitioner, and producing a diagnosis of a dental pathology by said second dental practitioner based on said camera image processed in said means for processing in said dental office of said second dental practitioner.

A kit for processing of dental x-ray films in a dental office for purposes of diagnosis of dental pathologies of patients is also provided, said kit comprising the above device for processing at least one positive, opaque image obtained from at least one developing dental x-ray film and at least one instructional device for explaining its use in the above method of diagnosis. The instructional device may be at least one device selected from the group consisting of printed materials, CD disks, magnetic data storage disks, and videotapes. In sum, the above and other objects, features and objectives of the present invention, shall become apparent with the following description whether in conjunction with the accompanying drawings, in which like reference numerical designating indicators designate the same elements.

BRIEF EXPLANATION OF THE DRAWINGS

FIG. 2 is a sectional view of a first half of the daylight loading film processing box containing a tank and a camera connected to a computer, monitor and printer according to the present invention.

DETAILED DESCRIPTION OF THE PREFERRED EMBODIMENTS

Definitions

Unless defined otherwise, all technical and scientific terms used herein have the same meaning as is commonly understood by one of skill in the art to which this invention belongs. All patents and publications referred to herein are incorporated by reference.

As used herein, a "camera" is any device that can produce an image that looks like it was taken with a known camera. Although a "camera" has been conventionally associated with lenses, some cameras, for example "pinhole" cameras, do not have lenses.

As used herein, "video camera means" is any camera that can produce an image that can be processed electronically.

As used herein, a "camera image" is any electronic, optical, or chemical image captured within a camera.

As used herein, the terms "positive image", "opaque image", and "opaque stage of development" refer to that stage in the development of dental x-ray film wherein the image on the film is an image similar in appearance to a normal black and white photographic print, and wherein amalgam "fillings", appear as white areas.

As used herein, the terms "negative image", "photographic negative", and "transparent-translucent film" refer to that stage in the development of dental x-ray film wherein the image on the film is an image similar in appearance to a normal black and white photographic negative.

As used herein, the words "transmit wavelengths of about 550–800 nanometers" mean that longer and shorter wavelengths are filtered out.

As used herein, the words "transmit wavelengths of about 600–700 nanometers" mean that longer and shorter wavelengths are filtered out.

Figure 1:
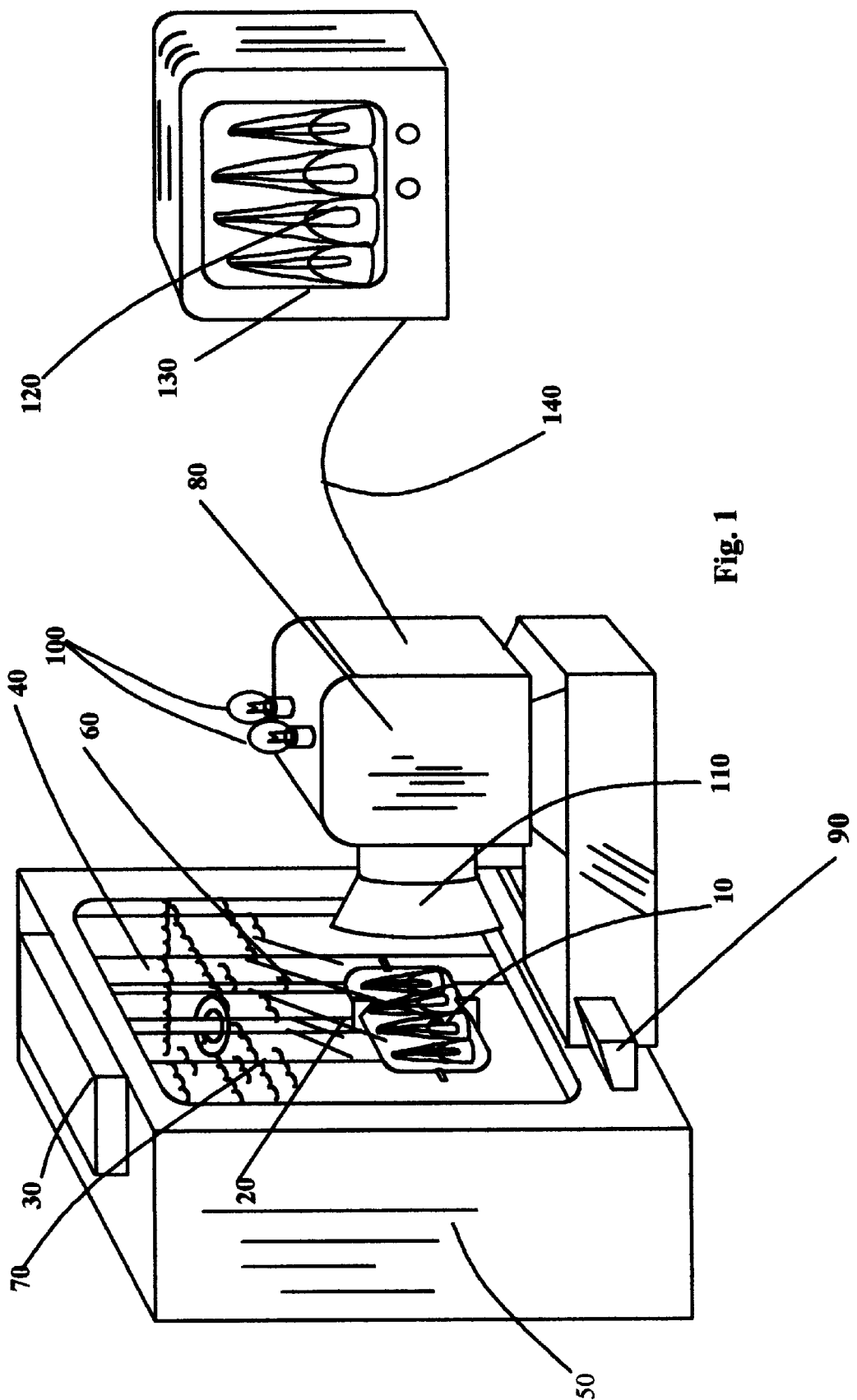
FIG. 1 is a perspective view of the tank, camera, and monitor according to the present invention.

Referring now to FIG. 1 a reaction tank 50 is filled with a film developer solution 70. Next, in a darkroom, at least one exposed dental radiographic film 10 is placed on a film cassette 20. Cassette 20 has a holding device 30 that makes possible the manual or mechanical insertion into and removal of film 10 from tank 50. Tank 50 and all other structures of the invention that come into contact with photographic processing solutions are constructed of corrosion resistant materials such as stainless steel or rigid plastics. Tank 50 and all other structures of the invention that could admit light to an exposed film during the development process are constructed either of opaque materials or of filter materials transparent only to light wavelengths that will not damage exposed film during development. The most generally suitable light filtering materials are those that transmit only yellow to red light having wavelengths of about 600–700 nanometers, but a wider range of about 550–800 nanometers may be satisfactory for certain films. A track 40 is utilized to retain holding device 30 at the correct distance from a camera lens 110 to provide a sharply focused image in a camera 80. Tank 50 has at least one window 60 on at least one side. In this embodiment, window 60 is composed of light filtering material transparent only to wavelengths of light that do not affect dental radiographic film 10 being processed to allow viewing of film 10 in the opaque stage. The most generally suitable light filtering materials are those that transmit only yellow to red light having wavelengths of about 600–700 nanometers, but a wider range of about 550–800 nanometers may be satisfactory for certain films. Film 10 may be inserted into tank 50 after filling with developer solution 70, or alternatively developer solution 70 may be flowed into tank 50 after film 10 is placed within. At least one video camera 80, for example, a Cohu 1100 series RS-170 monochromatic CCD camera, is movably and mechanically attached to the tank apparatus with at least one attachment device 90. Camera 80 is placed in a position in relation to film 10 to capture a sharply focused image of film 10 in the opaque stage of development. As developer solution 70 bathes film 10, camera 80 is powered. An adjustable light source 100 is mounted in a position to provide appropriate light for camera 80 to capture a high quality image. In the preferred embodiment, two 3-watt bulbs are placed above and on each side of the lens to avoid reflection of unwanted light into camera 80. A lens 110, for example a Fujinon HF9A-2 f/1.4 close-up lens, mounted on camera 80 is focused to provide a sharp image.

Figure 2:
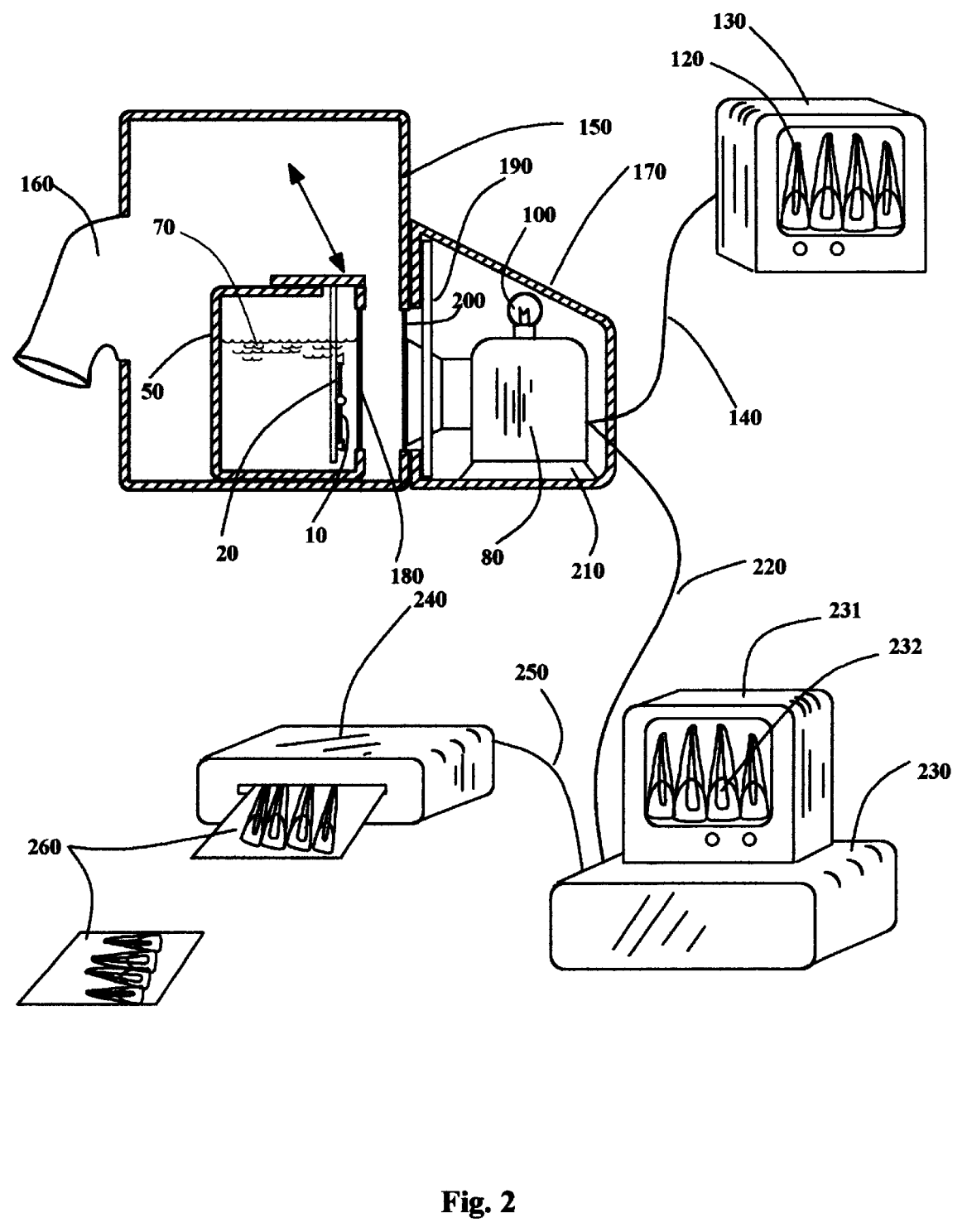

Referring to FIG. 2, the output of camera 80 may be sent via at least one cable connection 140 to at least one analog video monitor 130 for viewing as at least one monitor image 120. Alternatively, the output of camera 80 may be sent via at least one cable 220 to at least one computer 230 where it is digitized.

In an alternative embodiment, film 10 may be loaded without the use of a darkroom by the use of a manual daylight loader 150, or an automatic film processor. In loader 150, at least one sleeve or glove 160 is provided in a manner such that at least one of operator's hands can be placed through apertures in loader 150 to allow manipulation of film 10 without light damage. A light cover housing 170 isolates film 10 from ambient light, and only light source 100 illuminates film 10 to provide consistent illumination. A light diffusion plate 190 constructed of appropriate material such as ¼" white acrylic plate, or the like ensures even distribution of light on film 10 and prevents glare.

In a preferred alternative embodiment, loader 150 has a window 200 composed of light filtering material transparent only to wavelengths of light that do not affect dental radiographic film. The most generally suitable light filtering materials are those that transmit only yellow to red light having wavelengths of about 600–700 nanometers, but a wider range of about 550–800 nanometers may be satisfactory for certain films. In this embodiment, tank 50 has a non-filter window 180.

The output of camera 80 may be sent via at least one cable connection 140 to at least one video monitor 130 for viewing as at least one monitor image 120. Alternatively, the output of camera 80 may be sent via at least one cable 220 to at least one computer 230 where it is digitized and stored, and may then be frozen, enlarged, colorized, and manipulated in different ways advantageous to dental diagnosis, while being viewed as image 232 on at least one computer monitor 231. The output of computer 230 may also be sent via at least one cable 250 to at least one printer 240 for creating at least one hard copy 260.

A video monitor 130 is preferably located in close proximity to camera 80 to allow the operator to aim and focus camera 80, and to adjust the lighting while viewing the image. Further monitors 130 may be located in the operatories and throughout the dental office for convenient viewing as the dentist requires.

Figure 3:
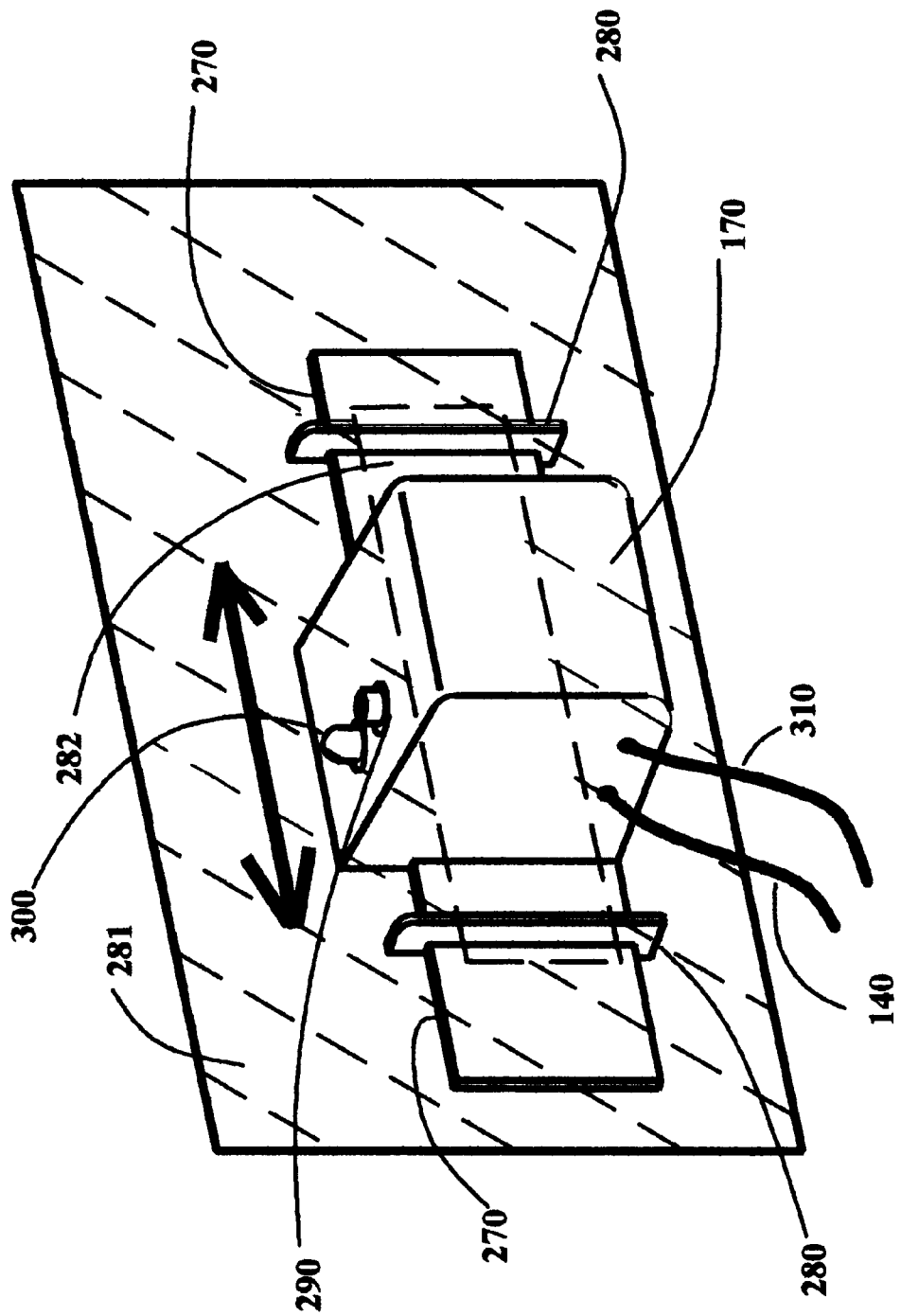
FIG. 3 is a plan view of the movably mounted camera according to the present invention.
Figure 4:
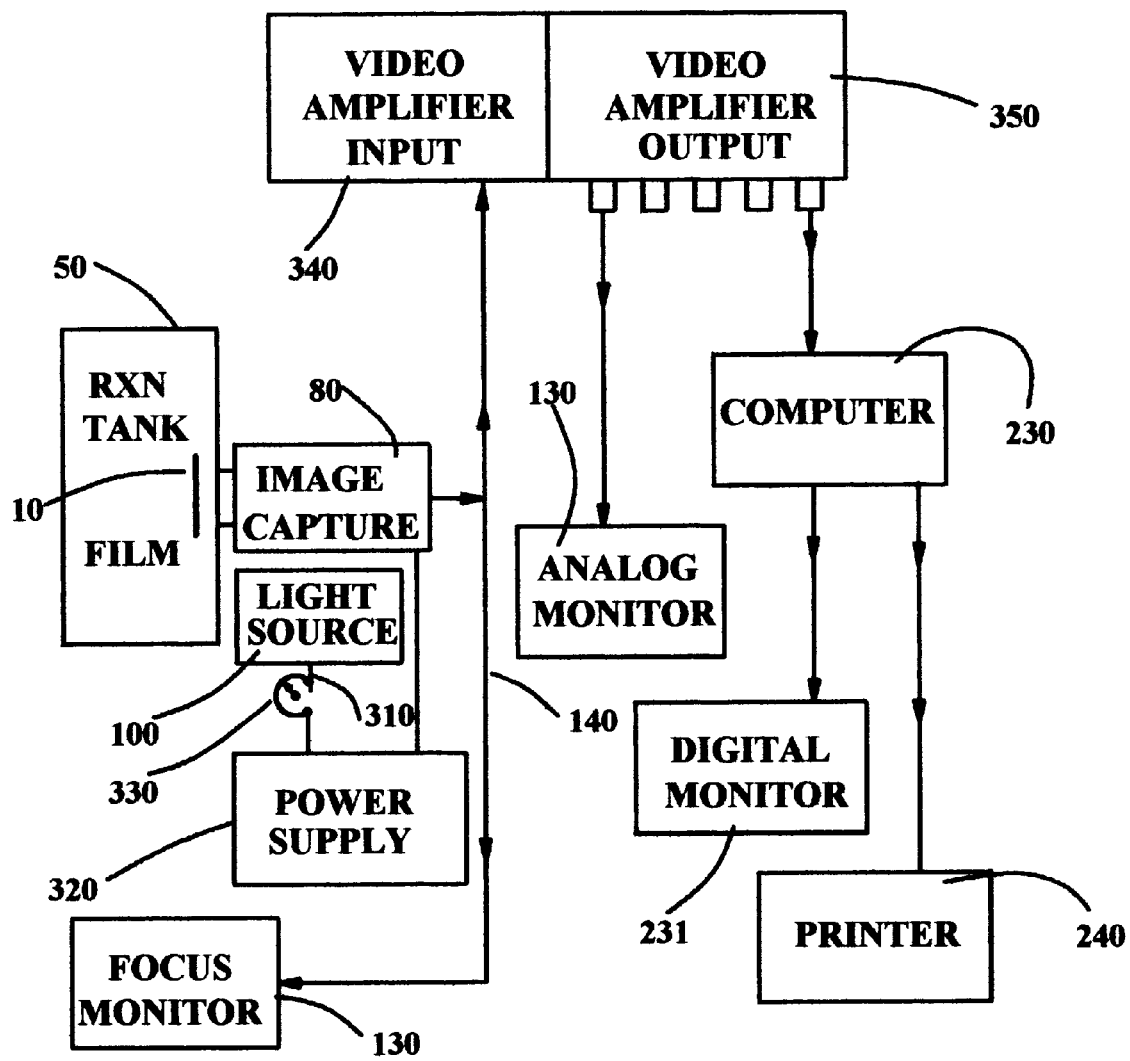
FIG. 4 is a schematic diagram showing the connections of the parts according to the present invention.

Referring to FIGS. 3 and 4, in another embodiment of the invention housing 170 is slideably mounted to tank 50 by means of two rectangular wings 270 fixedly attached to the right and left sides of housing 170. Wings 270 are slideably inserted into two brackets 280 to support said wings 270 and housing 170 in a manner to hold said wings loosely enough to allow for the free right-left movement of the said camera yet tight enough to keep camera 80 against a window 282 in processor wall 281 so that ambient (room) light will not reach the film being processed while sliding camera 80 to view a plurality of film images. Camera 80 may be provided with a power on-off switch 290 and a red indicator light 300. A power cable 310 carries power to the video camera from a power supply 320. Light source 180 can be adjusted for brightness by an electronic device such as a variable resistor 330. Depending on the number of monitors, a video amplifier input 340 and output 350 may be required.

Figure 5:
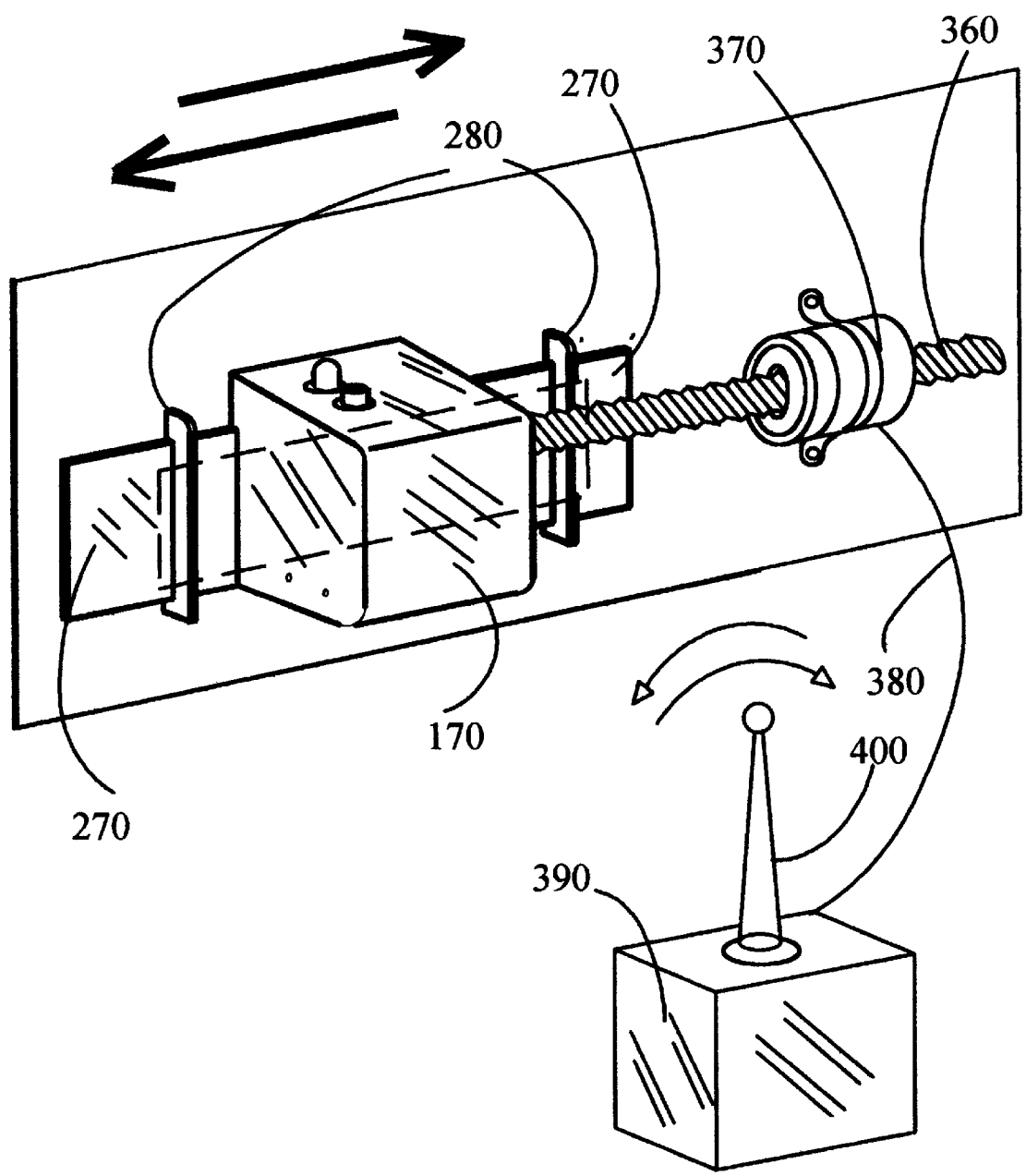
FIG. 5 is a perspective view of a motorized embodiment of the present invention.

Referring to FIG. 5, in another embodiment of the invention a worm gear 360 is coupled to a reversing motor 370 by an electronic coupling 380 to motorize movement of camera 80. A controller 390 actuated by a joystick 400 actuates motor 370.

On this basis, the instant invention should be recognized as constituting progress in science and the useful arts, as solving the problems in dental radiography enumerated above.

In the foregoing description, certain terms have been used for brevity, clearness and understanding, but no unnecessary limitation are to be implied therefrom beyond the requirements of the prior art, because such words are used for descriptive purposes herein and are intended to be broadly construed.

Having described preferred embodiments of the invention with reference to the accompanying drawings, it is to be understood that the invention is not limited to those precise embodiments, and that the various changes and modifications may be effected therein by one skilled in the art without departing from the scope or spirit of the invention s defined in the appended claims. For example, the product can have other shapes, or could make use of other metals and plastics. Thus, the scope of the invention should be determined by the appended claims and their legal equivalents, rather than by the examples given.

What is claimed is:

1. A device for processing at least one positive, opaque image obtained from at least one developing dental x-ray film comprising in combination:

(a) a reaction tank adapted to position said at least one exposed film situated in an X-Y plane in a holder;

(b) at least one mounted video camera means adapted for forming a camera image of said at least one positive opaque image of said at least one film;

(c) said reaction tank including at least one window to allow said at least one video camera to capture said at least one positive opaque image of said at least one film; and (d) at least one means for processing said camera image.

2. The device of claim 1, wherein:

(a) said camera means includes a lens means having an optical axis aligned along a Z-axis perpendicular to said X-Y plane;

(b) said lens means is arranged for acquiring said at least one camera image of said at least one film; and, (c) said lens means is adapted to provide said camera image in a sharply focused manner.

3. The device of claim 1, further comprising at least one controllable light source adapted for illuminating said at least one positive opaque image for acquisition by said camera, wherein said light source emits light of wavelengths selected from the group consisting of wavelengths of about 550–800 nanometers, and wavelengths of about 600–700 nanometers.

4. The device of claim 1, where in said window is composed of a light filtering material selected from the group of consisting of materials that transmit wavelengths of about 550–800 nanometers, and materials that transmit wavelengths of about 600–700 nanometers, whereby said device can be used in daylight.

5. The device of claim 4, further comprising at least one controllable light source adapted for illuminating said at least one positive opaque image for acquisition by said camera.

6. The device of claim 5, further comprising situating said tank within a daylight loader box adapted with:

(a) at least one sleeve adapted for inserting at least one hand of an operator into said loader with exclusion of ambient light;

(b) at least one window composed of a light filtering materials selected from the group of consisting of materials that transmit wavelengths of about 550–800 nanometers, and materials that transmit wavelengths of about 600–700 nanometers, said window adapted to provide:

a camera port for said camera means; and
an observation port for the operator;
whereby said device can be operated in daylight.

7. The device of claim 1, wherein said camera means is arranged to move in a second X-Y plane for acquiring said at least one positive image of said film; and further comprising:
(a) means for moving said camera means as required in the Y-direction; and,
(b) means for moving said camera means as required in the X-direction.

8. The device of claim 1, wherein said films are arranged to move in said X-Y plane for acquiring said at least one positive opaque image of said film; and further comprising:
(a) means for moving said films as required in the Y-direction; and,
(b) means for moving said films as required in the X-direction.

9. The device of claim 7, wherein said means for moving said camera means as required in the X-direction is mounted on a carriage means, and wherein said carriage means is able to move in a Y-direction, whereby said camera means can be manually positioned at any predetermined XY coordinate position by an operator.

10. A device according to claim 1, wherein said means for processing includes at least one apparatus selected from the group consisting of analog video monitors, digital monitors, hard copy devices, computers, and data storage devices.

11. A device according to claim 1, wherein said lens means is a close-up video lens.

12. The device of claim 9, wherein:
(a) said means for moving said camera means as required in the Y-14 direction; and,
(b) said means for moving said camera means in the X-direction; are at least one electric motor wherein said motor;
(c) is controlled by an operator directed control device to move said camera means to a predetermined XY coordinate position; and,
(d) is mechanically linked to said camera means.

13. A method for capturing and processing at least one positive, opaque image obtained from at least one developing dental x-ray film in a device for processing at least one positive, opaque image obtained from at least one developing dental x-ray film, said device comprising, in combination;

(a) a reaction tank adapted to position said at least one exposed film situated in an X-Y plane in a holder:
(b) at least one mounted videocamera means adapted for forming a camera image of said at least one positive opaque image of said at least on film;
(c) said reaction tank including at least one window to allow said at least one video camera to capture said at least one positive opaque image of said at least one film; and,
(d) at least one means for processing said camera image, said method further comprising the steps of:
(a) transferring said at least one film and holder into said reaction tank,
(b) allowing said film to be bathed in developer solution to create said at least one positive opaque image on said film;
(c) identifying a predetermined at least one said image to be displayed;
(d) positioning said video camera means to capture at least one predetermined image on said predetermined at least one film;
(e) adjusting the illumination output of an illumination means of said device to a level allowing capture of said image;
(f) focusing a lens means of said camera means to allow capture of said image as a focused image;
(g) operating said camera means to record said camera image;
(h) transmitting said camera image to said means for processing said camera image; and,
(i) processing said camera image in said means for processing.

14. The method of claim 13, wherein said means for processing includes at least one apparatus selected from the group consisting of analog video monitors, digital monitors, hard copy devices, computers, and data storage devices.

15. A kit for processing of dental x-ray films in a dental office for purposes of diagnosis of dental pathologies of patients, said kit comprising:
(a) the device of claim 1; and
(b) at least one instructional device for explaining the use of said device.

16. A kit according to claim 15, wherein said instructional device includes at least one device selected from the group consisting of printed materials, CD disks, magnetic data storage disks, and videotapes.

* * * * *